(12) United States Patent
Wu et al.

(10) Patent No.: US 8,493,621 B2
(45) Date of Patent: Jul. 23, 2013

(54) OPTIMAL PATCH CODE DESIGN VIA DEVICE CHARACTERIZATION

(75) Inventors: Wencheng Wu, Webster, NY (US); Edul N. Dalal, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 952 days.

(21) Appl. No.: 12/462,527

(22) Filed: Aug. 5, 2009

(65) Prior Publication Data
US 2011/0032544 A1 Feb. 10, 2011

(51) Int. Cl.
*H04N 1/40* (2006.01)

(52) U.S. Cl.
USPC .................................... 358/2.1; 358/468

(58) Field of Classification Search
USPC ............... 358/3.28, 1.9, 2.1, 468, 3.23, 1.14, 358/400, 500, 402, 406, 504
See application file for complete search history.

(56) References Cited

U.S. PATENT DOCUMENTS

| | | |
|---|---|---|
| 6,972,867 B1 | 12/2005 | Venable et al. |
| 2006/0028699 A1 | 2/2006 | Venable et al. |
| 2008/0204773 A1 | 8/2008 | Morgana et al. |

*Primary Examiner* — Thomas D Lee
*Assistant Examiner* — Stephen M Brinich
(74) *Attorney, Agent, or Firm* — Fay Sharpe LLP

(57) ABSTRACT

A method for optimally using color patch codes or color barcodes for transmitting machine-readable information, via device characterization, is disclosed to comprise characterizing a printing device and optionally a sensing device for identifying a number of recognizably spaced printer output colors; deriving a code book, by relating the printer output colors and their corresponding input values to information elements; and using the code book for encoding and decoding the information to be transmitted. The recognizably spaced printer output colors are in terms of a color space relevant to a color patch code or color barcode sensing device, and are related to the corresponding marking device input values.

22 Claims, 4 Drawing Sheets
(2 of 4 Drawing Sheet(s) Filed in Color)

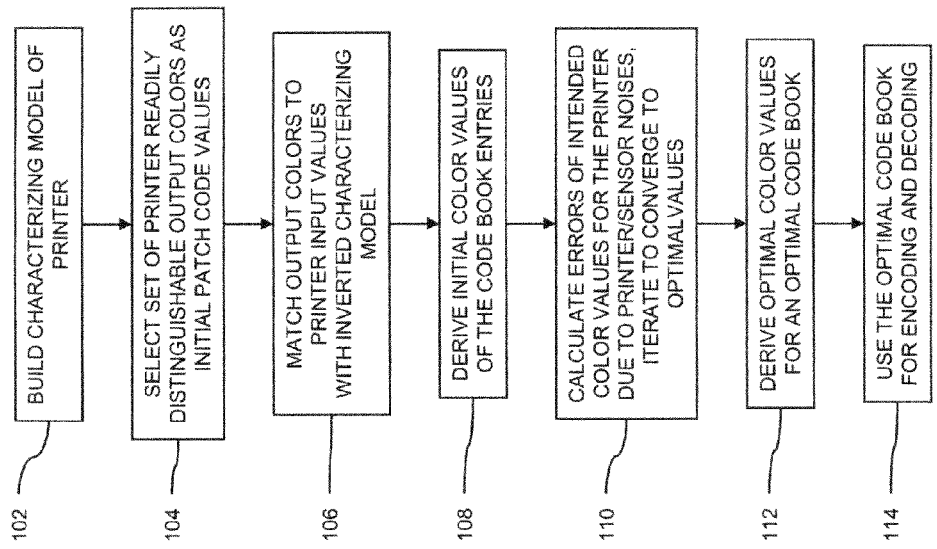

OPTIMAL PATCH CODE DESIGN VIA DEVICE CHARACTERIZATION

BACKGROUND

The exemplary embodiments relate to the optimal selection of colors to be used in color indicia systems such as patch codes, color barcodes and the like, in a printed image for conveying information that can be read calorimetrically. "Indicia" refer in this document to any marks on a hardcopy substrate that can be encoded to represent information, and can be read by a calorimetric sensor and thereby decoded. The calorimetric sensor may be, for example, a spectrophotorneter, a calorimeter, or a scanner. The scanner may be, for example, an RGB flatbed scanner, a drum scanner, a hand-held scanner, or an inline scan-bar in a printing or finishing or inspecting device.

Patch code systems are similar to the well-known barcode systems, and can be used in place of barcode systems or to augment or enhance them. In barcode systems, information is primarily encoded spatially, while in patch code systems information is primarily encoded calorimetrically. Thus, patch code systems are well suited for use in color measurement devices, such as spectrophotometers, that cannot read barcodes due to limited spatial resolution. In addition, in "color barcodes," the information can be encoded both spatially (one-dimensional or two-dimensional) and calorimetrically, thus significantly increasing information density. These hybrid systems have characteristics of both barcodes and patch codes, and the patch code improvements discussed in this document are applicable to such systems as well.

Automated color measurement is commonly used when large volumes of measurements are required, for example in color calibration or characterization of printing devices. The spectrophotometers used in such automated measurements typically have very high colorimetric accuracy but poor spatial resolution, thereby making barcodes unsuitable for use. Patch codes are ideally suited for such applications, allowing job identification data, process automation commands, and other information to be encoded according to a scheme in which the data is printed according to a protocol and in a format approximately identical to a format of the calibration target.

Although the application described above is well suited to color sensing devices, such as spectrophotometers, which have relatively low spatial resolution, it should be understood that this invention is also applicable to several other applications, including those using sensing devices having higher spatial resolution. For example, this invention can be used to optimize the colors used in color barcodes, to maximize the information density possible in a given area of hardcopy, for specific printing and sensing devices.

In this document, the term "code book" refers to a data collection (e.g., a table) relating each information element to the corresponding indicia color value. Information elements are the basic blocks in terms of which information is to be conveyed by each indicia color. More complex information elements such as alphanumeric characters, words, equipment identification, etc., may be composed of combinations of one or more of the basic elements, i.e., in terms of multiple patches. The color values are represented in marking device input parameters ("input values" such as CMYK or Lab) and/or in sensing device output parameters ("output colors" such as RGB or Lab). Code books can be used to encode information elements into the corresponding printer color values, as well as to decode measured color values back into the corresponding information elements. The information elements and/or the corresponding color values are referred to as code book entries.

Like most coding schemes with noises in both the encode and decode phases, there is an inherent tradeoff between decoding robustness and the number of code levels available for use as code book entries. For example, in U.S. Pat. No. 6,972,867, a system is disclosed that is highly robust for many measurement devices for samples from different printers, but this was achieved at the expense of only a small number of available code levels. Only eight levels were required, thus only eight distinct colors were needed; these are so distinct that most measurement devices can differentiate between them easily, even with prints rendered by different printers at different times. Therefore, generally there is no need for calibration/characterization of sensors and printers in generating patch codes and decoding them. For example, it is very easy to distinguish between red and green even though different printers give different red and green and different measurement devices read red and green a bit differently. Since it is so distinct the code value associated with red would not be mistaken for green in the decoding even with severe noises in the printing and sensing devices.

In U.S. Publication No. 2008-0204773-A1 published Aug. 28, 2008, entitled PATCH CODES WITH IMPROVED ROBUSTNESS, by Morgana and Klassen, a modification is made wherein more code levels are possible, by printing and measuring test patches using the printers and sensors of interest, to determine readily distinguishable patch codes. In particular, a set of candidate CMYK values for patch codes is first printed, with repeats, by various printers in scope. These multiple copies of the candidate CMYK values are then scanned to get their corresponding RGB values. Clustering and filtering are then done to remove patches that can be confused in the decoding process based on measured RGB values (e.g. if two CMYK combinations have RGB values that are too close to each other, one or both are removed). The CMYK values of the surviving patches and the average RGB values of their corresponding scans form the color values in the code book. For encoding, these CMYK values from the code book would be used for printing patch codes. For decoding, patch codes would be scanned and their RGB values would be compared to the code book to extract the intended code values and thereby the intended information elements. This allows a greater number of code levels to be achieved, but since the starting point is a uniform distribution in CMYK space, the distribution of the colors in sensor RGB space is an uncontrolled outcome, and the choice of color values, although increased, is sub-optimal.

Given the desire for including as much information as possible in a given area of the color patch code or color barcode, there is a need for an improved method and system for deriving optimal indicia color values which can maximize a number of code levels while maintaining an acceptable decoding robustness.

More particularly, there is a need for a system that can assess available indicia color values and the desired number of code levels, optimally distribute the code levels relative to their detection by the scanner or spectrophotometer, and derive corresponding printer input signals to the optimally distributed output colors representative of the coded information elements for the best combination of robustness and information capacity in the code book derivation.

INCORPORATION BY REFERENCE

The following references, the disclosures of which are incorporated herein in their entireties by reference, are mentioned:

U.S. Pat. No. 6,972,867 issued Dec. 6, 2005, and Divisional Application 20060028699, both entitled PATCH CODES FOR COLOR CALIBRATION JOB IDENTIFICATION ENCODING, by Venable, et al., disclose a color calibration job identification system and method in which job identification data is encoded on a printed page, in a patch code, along with color targets. The patch code includes a first portion, including a start code, and a second portion, including job identification data. The first and second portions of the patch code each include two or more small color patches, each having a predefined color.

U.S. Patent Publication No. 2008-0204773 A1, entitled PATCH CODES WITH IMPROVED ROBUSTNESS, by Morgana and Klassen, discloses a color calibration identification system wherein job identification data is encoded in a patch code along with color targets wherein the patches comprise color values associated with and identified by a data value in a data structure wherein the data structure can be accessed to identify the data values with identified color values in the patch code. Information about the printed page is determined from the identified data values.

BRIEF DESCRIPTION

In accordance with the aspects of the exemplary embodiments, a method is disclosed for using patch codes or color barcodes in a printed image for conveying information that can be read calorimetrically. The method comprises characterizing a printing device in order to identify an appropriate number of recognizably spaced printer output colors and deriving a code book by relating these colors to the desired information elements. The code book is then used for encoding and decoding the information to be conveyed. The recognizably spaced printer output colors are in terms of a color space relevant to a patch code or color barcode sensing device, and are related to the corresponding marking device input values.

In accordance with another aspect of the exemplary embodiments, deriving the code book comprises using an inverse model of printing device operation and setting code book entries in correspondence to recognizably spaced printer output colors, which are inside the gamut of the printing device. In yet another embodiment, identifying an appropriate number of recognizably spaced printer output colors and deriving the code book comprises first identifying printer output colors in a sensing device relevant color space as initial set points and determining corresponding printer input values using an inverse model, then applying these printer input values together with device noise distributions at the initial set points to calculate corresponding color output distributions based on a forward model, updating the printer output colors as a converged representation of the color output distribution, identifying the corresponding printer input values, and then using the printer input values and printer output colors as the code book entries.

In accordance with another aspect of the exemplary embodiments, a system is disclosed for using color indicia in transmitting machine-readable information. The system comprises selecting a set of printer output colors adequately distinguishable by a sensing device, identifying a corresponding set of input signals to the printing device for the selected set of printer output colors based on a characterizing model for the printing device and optionally a characterizing model for the sensing device, using these adequately distinguishable printer output colors to derive a code book, which describes how the information is to be encoded and decoded, and using the code book for encoding and decoding the information to be transmitted.

BRIEF DESCRIPTION OF THE DRAWINGS

The file of this patent contains at least one drawing executed in color. Copies of this patent with color drawing(s) will be provided by the Patent and Trademark Office upon request and payment of the necessary fee.

FIG. 3 illustrates a protocol for building an optimally derived set of indicia color values via device characterization.

DETAILED DESCRIPTION

Aspects of the exemplary embodiments relate to systems and methods for encoding information on printed pages in the form of color indicia.

Color indicia systems are useful in color measurement devices having limited spatial resolution, such as spectrophotometers. They are also useful in devices having high spatial resolution, such as image scanners, through the use of "color barcodes," which are one-dimensional or two-dimensional coded images where the information can be encoded both spatially and calorimetrically, thus significantly increasing information density relative to monochromatic barcodes. In this latter application, the "patches" may be line segments, dots, etc., and the optimized color values are used to determine the discrete colors used in the color barcodes.

The input values of the patches used in generating color indicia are selected from a set of code book entries. Each patch in the set is associated with a particular information element, typically an alphanumeric value or other unique datum value. An indicia decoding system assigns an intended code value to each printed patch, based on a comparison of the sensor output color for that patch with the color values listed in the code book.

One exemplary application of patch codes is in color calibration of printers. For color calibration applications, in order to maximize robustness, it is desirable to minimize the number of times a human operator has to manipulate printed pages. It is therefore advantageous to have a color sensor, such as a color scanner or a spectrophotometer, that scans for color values (calibration data) also scan for job identification information. A spectrophotometric scanner typically used for calibration moves the sensor to a particular coordinate and then commences scanning for color values. Coordinate information or other information can be used to distinguish patches in the patch code from patches in the calibration target.

Figure 1:
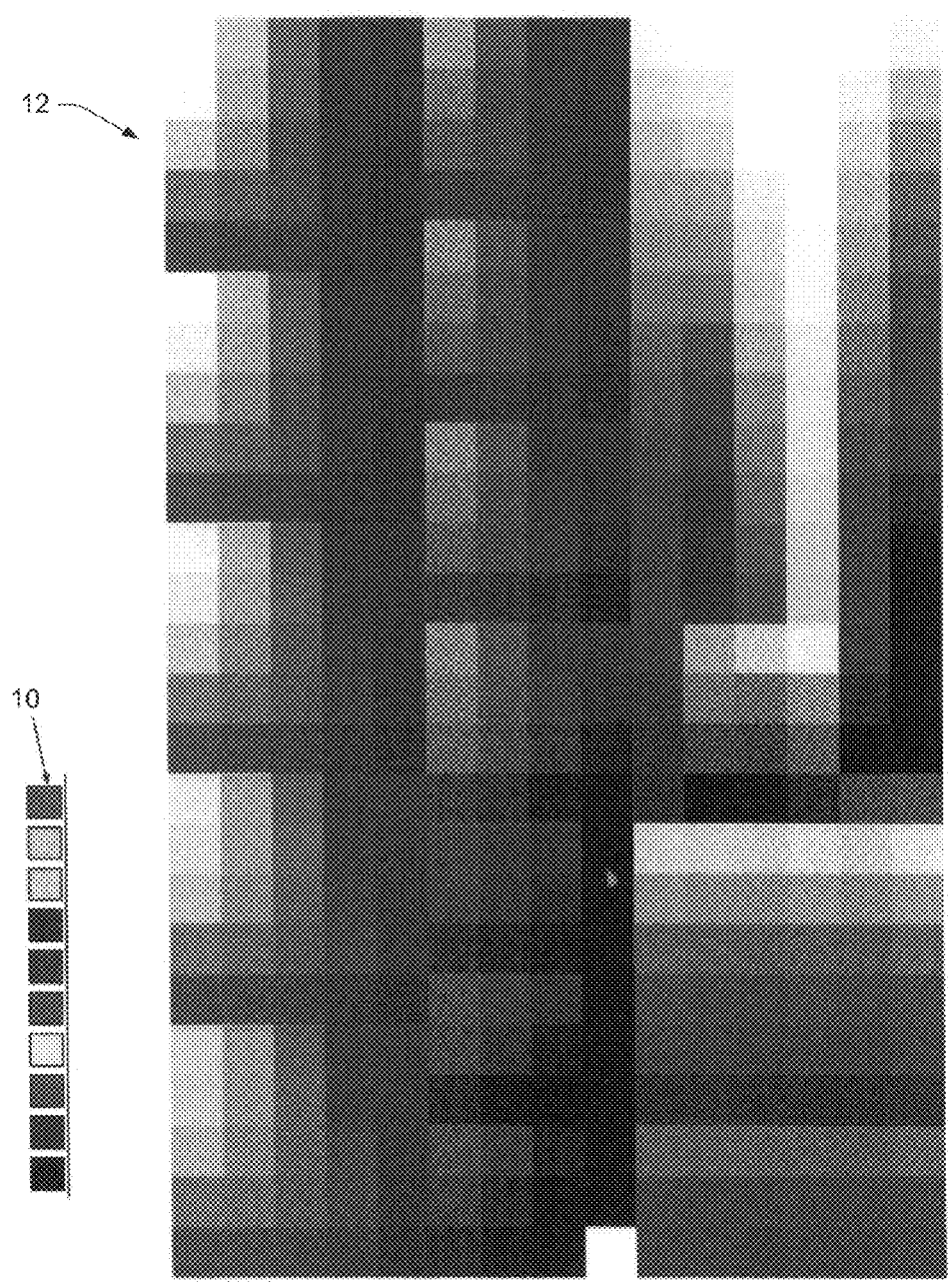
FIG. 1 is an exemplary color calibration test pattern for a printing device, illustrating the use of patch codes for identification and measurement specifications of the test pattern. The patch codes are meant to be read by a spectrophotometer while measuring the color patches on the test pattern.
Figures 2A, 2B:
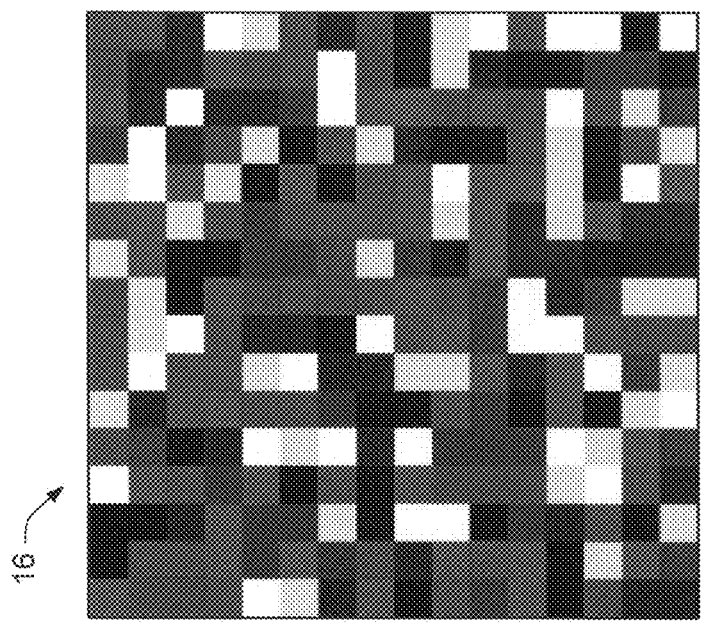
FIGS. 2a and 2b illustrate an exemplary color barcode.

In such an application, patch codes comprise at least one and typically a plurality of small color patches 10 (FIG. 1) printed on a hardcopy sheet for conveying various kinds of information such as to identify the printer, test-pattern, measurement instructions, etc. In the exemplary embodiment of FIG. 1, the content 12 is a calibration target comprising a set of color patches, although it is to be appreciated that the content may be text, images or a combination thereof. Although the patch codes shown in FIG. 1 consist of relatively large square patches, which are appropriate for that application, it should be understood that the patches may be of any size, shape or arrangement, within the detecting capability of the particular sensing device. As an example, FIGS. 2a and 2b illustrate one potential type of two-dimensional color barcode, where information can be encoded both spatially and calorimetrically. The letters 14 are just the short hand of the colors FIG. 2a of the color barcode 16 in FIG. 2b.

The codes WCMYKRGB are for white, cyan, magenta, yellow, black, red, green, blue and illustrate an exemplary color barcode that was built with eight fundamental colors. The subject embodiments can be used to choose more recognizable fundamental colors such as different shades of red, green, blue, etc. to maximize the information density of a color barcode.

The subject embodiments can be applied to determine the optimal color values for the calorimetric aspects of the encoding and decoding of color barcodes.

A functional block diagram of an exemplary method for deriving an optimal code book via device characterization is shown in FIG. 3. An optimal code book is a list of the optimal color values for a given set of devices and a given number of code levels, together with the associated information elements, i.e., it is a list of the optimal code book entries. For each input value of a code book entry, there is a corresponding cloud of output colors rather than just a single output color, due to printer and sensor noises. Each optimal output color value used as a code book entry is represented by the center of the cloud of output colors, optionally including information about the shape and orientation of the cloud, which in turn may be represented by a parameterized function such as an ellipsoid, or by a LUT (Look-up Table). In cases where the cloud of output colors is not spherical, there is value in retaining information on the shape and orientation of the cloud in order to maximize the number of recognizably distinct output colors. The method includes three steps: first, device characterization, second, derivation of optimal code book, and third, the use of the indicia (encoding and decoding). Output color detection is discussed below in terms of use of a spectrophotometer since one possible use of patch codes is for such instruments. However, it should be understood that the subject embodiments are also applicable to other measurement devices, such as scanners.

In the first step, accurate printer characterization models are built 102. Device characterization models (ICC destination profiles) describe the relationship between printer input values (CMYK) and output colors (Lab). Typically, these models have already been generated for color management purposes and are readily available, in which case building the model in the context of the subject embodiment is really a data analysis task without the need for any printing or color measurement. For example, if a user is interested in using a common code book for all printers in a single shop, one can use the collection of destination profiles of these printers for device characterization and continue on to the next step without any additional printing and measuring.

Alternatively, if scanners are used rather than spectrophotometers for sensing the indicia, one might choose to concatenate a printer forward model (CMYK→Lab, obtained from the printer destination profile) and an inverse of the scanner profile (Lab→RGB, obtained from scanner characterization) to get CMYK→RGB, rather than printing and measuring.

The subject embodiments relate to deriving an optimally spaced set of output colors which are robust to printer and sensor noises, by using the inverse model Lab→CMYK (destination profile) of the printing device and setting the input values of the code book entries at those CMYK values that are distributed optimally in the in-gamut Lab color space (or some fraction thereof such as 90% gamut, to be conservative). A distinguishing factor of the subject embodiments is that the code book entries are derived with particular attention to the spacing in printer output Lab space (or optionally in scanner output RGB space, if scanners are used as the sensing element), instead of the printer input CMYK space, thereby avoiding code book entries that may be easily confused with one another where they are too close together in the decoding color space. It can be readily appreciated that this is especially critical when the number of code levels desired is high and/or when the noise level from the printers and sensors is high.

A set of adequately distinguishable printer output colors are selected 104 as the initial indicia values. The initial set is selected with respect to a noise-free case to get initial output color set points for the code book. Since the derivation of optimal code values is based upon a forward and an inverse model the selected output colors are matched 106 to input values with the inverted characterizing model, i.e., output color Lab set points are matched to input CMYK values. From such a matched set the initial color values of the code book entries can be derived 108. For practical implementation, printer and/or sensor noise contributions to the robustness of encoding and decoding using the above mentioned code book must be taken into account. This is achieved by calculating errors of the intended color values 110 due to printer and/or sensor noises, from which a set of optimal (with respect to printer and sensor noises) output colors is determined, as will be explained with reference to FIG. 4 below. From the converged set of optimal output colors, the optimal color values for an optimal code book can be derived 112 which can be used 114 for encoding and decoding patch codes (in applications such as automating color measurements of printer calibration) or color barcodes.

Figure 4:
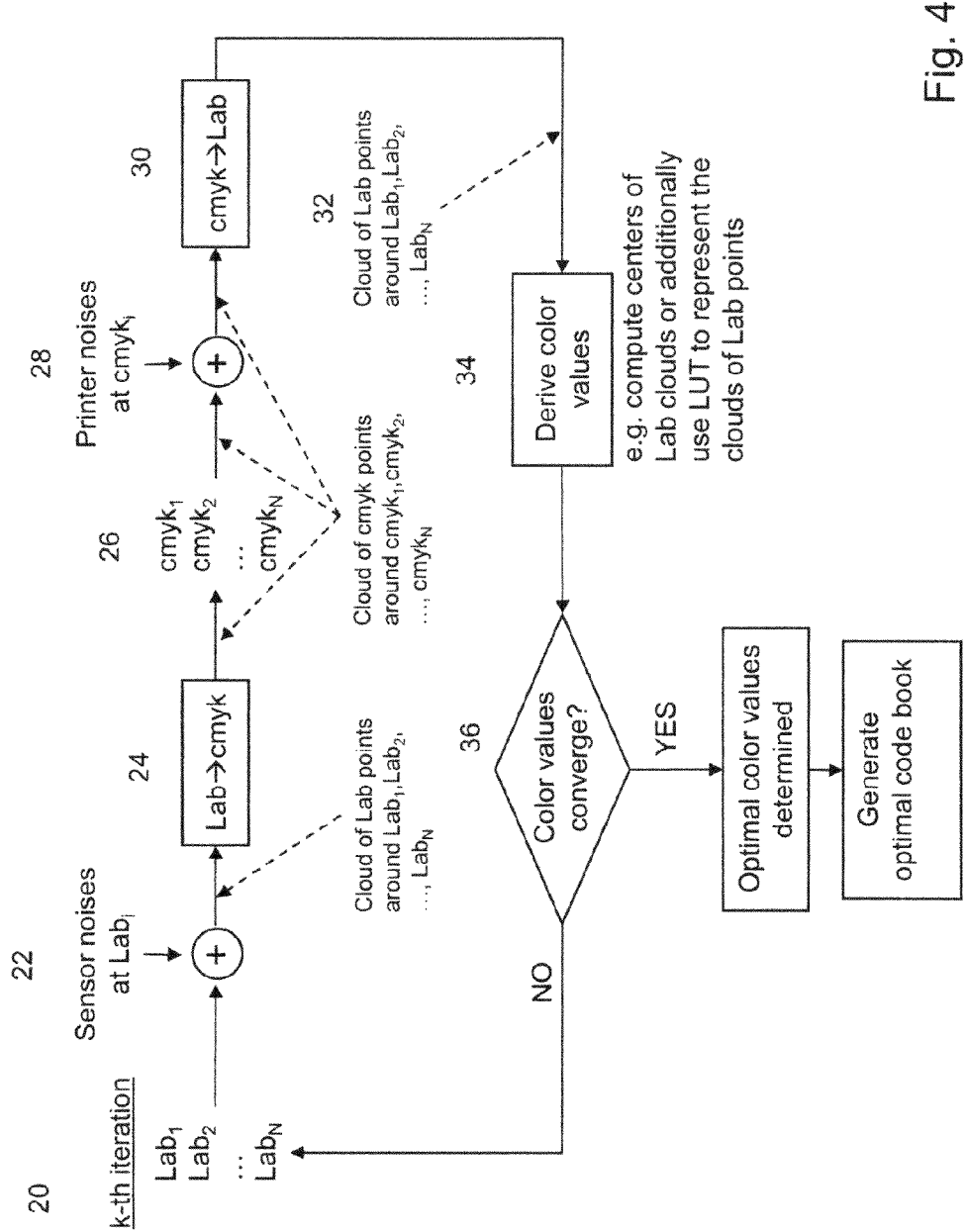
FIG. 4 is a protocol of an algorithm for deriving an optimal code book by searching the forward and inverse model, and with sensor and printer noises included.

With particular attention to FIG. 4, the iterative process for converging to optimal code book values in consideration of printer and sensor noises is represented. It can be seen that a plurality 20 of iterations is employed to obtain a desired convergence by interactively simulating CMYK input values together with noise distributions at the set points of the CMYK input values from previous iterations, and using the forward model to get the output color distributions. More particularly, sensor noises are imposed 22 at the initial set points of output colors and then on subsequent iterations thereof so that a cloud of output colors are generated around the initial and subsequent set points. The inverse 24 of the characterizing model of the printing device generates the corresponding cloud of CMYK input values 26 which are used as inputs to generate estimated Lab output colors 32. Actual printer noises in the printing process 28 are included in generating such output colors 32 via the forward model 30. Each cloud of output colors so generated is used to derive 34 the color values of a code book entry. The derivation technique can use a simple averaging of the output colors of each cloud, i.e. the center of the cloud, together with its corresponding input CMYK value, as the color values of the code book entry for this cloud. Optionally or additionally, one can also use a LUT representing this cloud of Lab values, together with the corresponding input CMYK values of its center, as the color values of the code book entry for this cloud. The process is repeated until the color values of all code book entries converge 36 or the iteration number exceeds a predetermined value. The optimal color values of all code book entries are thus determined after the convergence. Finally, the optimal code book is generated with these optimal color values and the corresponding information elements. To extend the case to multiple printers and sensors, one possibility is to use the intersection gamut for in-gamut output colors and the average forward model CMYK→Lab, while treating the differences between individual printers as noise distributions.

The actual use 112 of the indicia is similar to conventional coding schemes. For encoding, users will determine which CMYK input values to use for a given patch of the indicia by looking up the code book entries. For decoding, the printed indicia will first be measured and the measured value (Lab) in the decoding space will then be compared to values in the code book to find the "most likely" intended value (e.g., the closest color center, in terms of say a Euclidean distance, is used as the intended code value). Additionally, known arts in coding schemes such as parity checking, error checking and corrupted code recovery can be included in the use of indicia to further improve the robustness.

With the addition of device characterization and the derivation of the optimal code book, it is now possible to have a more universal indicia definition for characterized printers. The idea is to define code book entries in terms of a device independent color space such as Lab, while letting each individual printer decide which CMYK input values to use to render these Lab output colors (via color management). This is equivalent to having a fixed decoding scheme but with "dynamic" encoding of CMYK input values for each code book value. This way a universal decoding scheme can be used reliably, within the accuracy and variability limitations of the printer and color management. For the purpose of indicia usage, highly accurate color rendering is not a requirement. It is necessary only that the color rendering is adequate to avoid ambiguity between the code book values. With current color management technologies and print quality of a broad set of printers, this invention provides more available levels at a similar level of robustness without any additional calibration/characterization cost since color management is already a part of the process.

It will be appreciated that various above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A method for using color indicia in transmitting machine-readable information, comprising:
   characterizing at least one of a printing device or a sensing device for identifying a number of recognizably spaced printer output colors;
   using these recognizably spaced printer output colors to derive a code book, which describes how the information is to be encoded and decoded; and,
   using the code book for encoding and decoding the information to be transmitted;
   wherein the recognizably spaced printer output colors are identified as centers of clusters of associated printer output colors.

2. The method of claim 1 wherein characterizing at least one of a printing device or a sensing device comprises at least one of characterizing the relationship between the input values and output colors, or characterizing the device noise distributions.

3. The method of claim 1 wherein the identifying comprises determining the recognizably spaced printer output colors from at least one of a destination profile characterization of the printing device or a characterization of the sensing device.

4. The method of claim 1 wherein the characterizing comprises using at least one of a preexisting printer device characterization model and a sensing device characterization model, whereby printing and measurement for the recognizably spaced printer output colors is avoided.

5. The method of claim 2 wherein the characterizing at least one of a printing device or a sensing device further includes at least one of characterizing the relationship between the input values and output colors, or characterizing the device noise distributions based on color instability and nonuniformity characteristics of at least one of the printing device and the sensing device.

6. The method of claim 1 wherein the number of recognizably spaced printer output colors is maximized based on capabilities of the printing and sensing devices.

7. The method of claim 1 wherein the number of recognizably spaced printer output colors is predetermined based on a number of code book entries required.

8. The method of claim 1 wherein the recognizably spaced printer output colors are in terms of a color space relevant to at least one of a patch code or barcode sensing device.

9. The method of claim 1 wherein the machine-readable information to be transmitted relates to a print job, including information necessary to identify a job, automate a job, or to provide job integrity.

10. A method for using color indicia in transmitting machine-readable information, comprising:
    characterizing at least one of a printing device or a sensing device for identifying a number of recognizably spaced printer output colors;
    using these recognizably spaced printer output colors to derive a code book, which describes how the information is to be encoded and decoded; and,
    using the code book for encoding and decoding the information to be transmitted,
    wherein identifying a number of recognizably spaced printer output colors and deriving the code book comprises first identifying printer output colors in a sensing device relevant color space as initial set points and determining corresponding printer input values using an inverse model, then applying the printer input values together with device noise distributions at the initial set points to calculate corresponding color output distributions based on a forward model, updating the printer output colors as converged representations of the color output distributions, identifying the corresponding printer input values, and using the printer input values and printer output colors as entries for the code book.

11. The method of claim 10 wherein the converged representations of the color output distributions are in terms of the centers of the color output distributions.

12. The method of claim 11 wherein the converged representations also include parametric functions or Look-up Tables for representing the color output distributions.

13. A system for using color indicia in transmitting machine-readable information, comprising:
    characterizing at least one of a printing device or a sensing device;
    identifying a number of recognizably spaced printer output colors;
    using these recognizably spaced printer output colors to derive a code book, which describes how the information is to be encoded and decoded; and, using the code book for encoding and decoding the information to be transmitted;

wherein the recognizably spaced printer output colors are identified as centers of clusters of associated printer output colors.

14. The system of claim 13 wherein the machine-readable information to be transmitted relates to a print job, including information necessary to identify the job, automate the job, or to provide job integrity.

15. The system of claim 13 wherein the color indicia includes color patch codes.

16. The system of claim 13 wherein the color indicia includes color barcodes.

17. The system of claim 13 wherein the number of recognizably spaced printer output colors is predetermined based on the number of code book entries required or is maximized based on the capabilities of the printing and sensing devices.

18. The system of claim 13 wherein the identifying comprises identifying recognizably spaced output colors based on at least one of the characterizing model and the printer noise distributions.

19. A system for using color indicia in transmitting machine-readable information, comprising:

characterizing at least one of a printing device or a sensing device;

identifying a number of recognizably spaced printer output colors;

using these recognizably spaced printer output colors to derive a code book, which describes how the information is to be encoded and decoded; and, using the code book for encoding and decoding the information to be transmitted;

wherein identifying a number of recognizably spaced printer output colors and deriving the code book comprises first identifying printer output colors in a sensing device relevant color space as initial set points and determining corresponding printer input values using an inverse model, then applying these printer input values together with device noise distributions at the initial set points to calculate corresponding color output distributions based on a forward model, updating the printer output colors as converged representations of the color output distributions, identifying the corresponding printer input values, and then using the printer input values and printer output colors as entries for the code book.

20. The system of claim 19 wherein the converged representations of the color output distributions are in terms of the centers of the color output distributions.

21. The system of claim 20 wherein the color output distributions also include parametric functions or Look-up Tables for representing the color output distributions.

22. A system for using color indicia in transmitting machine-readable information, comprising:

selecting a set of printer output colors adequately recognizable by a sensing device;

identifying a corresponding set of input signals to the printing device for the selected set of printer output colors based on at least one of a characterizing model for the printing device or a characterizing model for the sensing device;

using these adequately recognizable printer output colors to derive a code book, which describes how the information is to be encoded and decoded; and, using the code book for encoding and decoding the information to be transmitted;

wherein the printer output colors adequately recognizable are identified as centers of clusters of associated printer output colors.

\* \* \* \* \*